2,914,486

TREATMENT OF INORGANIC HYDROGELS

Albert B. Schwartz, Philadelphia, Pa., assignor to Socony Mobil Oil Company, Inc., a corporation of New York No Drawing. Application June 26, 1952
Serial No. 295,830

6 Claims. (Cl. 252—455)

This invention relates to a process for simultaneously drying and controlling the density of inorganic hydrogels. More particularly, the present invention is directed to a method in which an inorganic hydrogel without prior substantial dehydration after formation is subjected to superheated steam at an elevated pressure with the resultant production of a gel of controlled predetermined density.

Inorganic gels are widely employed as adsorbents, catalyst supports, and catalysts for a multitude of reactions including those of hydrocarbon conversion. To obtain the utmost efficiency from a hydrocarbon conversion gel catalyst, it is necessary to adjust the catalyst density to a predetermined value which will depend in part upon the conditions under which the conversion operations are carried out. Generally, the catalyst is contacted with hydrocarbon vapors at conversion conditions, for example, 800° F. to 1000° F. at atmospheric or greater pressures. The reaction which takes place is essentially a cracking to produce lighter hydrocarbons, but is accompanied by a number of complex side reactions, such as aromatization, polymerization, alkylation, and the like. As a result of these complex reactions, a carbonaceous deposit is laid down on the catalyst which is commonly called "coke." The coke tends to seriously impair the catalytic efficiency of the catalyst for the principal reaction and the conversion reaction is therefore suspended after coke, to the extent of a few percent by weight, has accumulated on the catalyst. The catalytic surface is then regenerated by burning the coke in a stream of oxidizing gas and the catalyst is returned to the conversion stage of the cycle. The rate at which coke can be burned from the spent catalyst decreases with an increase in the density of the catalyst. The activity and hardness of the catalyst are also affected by its density, the hardness of the catalyst increasing with an increase in density. It is, accordingly, desirable to adjust the density of the gel catalyst to an intermediate value between the maximum and minimum limits of density control in order to obtain the most beneficial effects of activity, hardness, and regeneration properties in the resulting catalyst.

It has heretofore been known that the density of certain gel catalysts can be effected by subjecting the hydrogel to a hydrothermal treatment which comprises contacting the freshly formed hydrogel with hot water for a specified period of time. The duration of the contact time and the temperature of the water used under such conditions determines the density of the dried gel. This method of density control has the disadvantage of being time-consuming under ordinary conditions of operation. Thus, in order to adjust the apparent density of a freshly formed hydrogel to between 0.60 and 0.75 gram per cc. using water at 100° F., approximately 36 to 48 hours are required. While this time of treatment may be reduced by increasing the temperature of the water, such procedure is not always feasible since subsequent air drying of hydrogels which have undergone treatment with excessively hot water leads to considerable gel breakage. Such breakage is especially undesirable where the production of gel particles of substantially uniform size and shape is sought, for example in the manufacture of spheroidal bead-like gel particles. The method of density control using hot water is further not effective in treatment of hydrogels containing appreciable amounts of magnesia or chromia, i.e., hydrogels containing more than about 3 percent by weight on a dry basis of these metal oxides. Thus, while silica and silica-alumina hydrogels upon treatment with hot water undergo reduction in apparent density, hydrogels of magnesia or chromia or hydrogels containing an appreciable amount of magnesia or chromia in combination with other metal oxides or silica for some unknown reason are substantially unaffected by treatment with hot water in so far as control of density is concerned.

Drying of inorganic hydrogels either after adjustment of density with hot water or in the absence of such adjustment has been accomplished by passing warm air over the hydrogel or by contacting the hydrogel with superheated steam at substantial atmospheric pressure. The extent of drying will depend somewhat on the use which it is desired to make of the product but, in any event, the drying is carried to a stage beyond that at which maximum shrinkage of the gel is obtained. In the usual operation, further drying proceeds after syneresis or shrinkage has been virtually completed until the gel is substantially dry; that is, the gel possesses open pores free of liquid although it still contains a relatively small percentage of water which may be removed by drying at relatively high temperatures.

It is an object of the present invention to provide a process in which density control and drying of inorganic hydrogels may be carried on simultaneously. Obviously, drying of hydrogels cannot be effected while the same are in contact with hot water under the usual conditions for adjustment of density. A further object of the invention is the provision of a comparatively rapid method for drying inorganic hydrogels with concurrent control of the density. A still further object is to provide a procedure for drying and effectively adjusting the density of hydrogels containing appreciable amounts of magnesia or chromia to a predetermined value.

The above and other objects which will be apparent to those skilled in the art are accomplished by the process of the present invention. Broadly, the method of the invention comprises contacting an inorganic hydrogel, which has not undergone substantial dehydration after formation, with superheated steam at an elevated pressure in excess of 100 pounds per square inch and maintaining said pressure until shrinkage of the hydrogel is substantially complete. In a preferred embodiment of the invention, a hydrogel, which has not undergone substantial dehydration after formation, is dried to a predetermined density by bringing the same into contact with superheated steam at a pressure in the range of 100 to 500 pounds per square inch, the choice of pressure being correlated with the desired density of the gel product. The hydrogel undergoing treatment, in accordance with the instant method, may be freshly formed or may have been previously aged, base-exchanged, impregnated, or otherwise treated providing that no substantial dehydration of the hydrogel occurs after formation.

Superheated steam, that is, steam at a temperature so that it possesses more than enough heat to maintain its existence as a dry gas at the given pressure, is necessarily employed as the predominant drying medium. Slight dilution of the steam may be tolerated within bounds of the preferred embodiments of the invention. However, the drying gas should be predominantly steam, i.e., at least about 90 percent or more water vapor by voluume, The temperature of the superheated steam is necessarily above saturation temperature at the pressure employed. Usually, the temperature of the superheated steam will be between about 350° F. and about 800° F. It is contemplated that the process described herein is applicable for drying and controlling the density of inorganic hydrogels generally without regard to composition or physical form. The method has, however, been found to be particularly useful in drying uniformly shaped hydrogel particles such as beads. In such instance, bed depth of hydrogel particles up to 12 inches may be conveniently treated with superheated steam at a pressure above 100 pounds per square inch. The method, further, has been found to be particularly useful in treating hydrogels containing appreciable amounts of magnesia or chromia with the production of gels of predetermined density.

The desired density of the final gel catalyst will depend on the coke-burning capacity of the regenerating kiln employed, the particular degree of hardness desired in the catalyst and the activity of the resulting catalyst. High density catalysts have the disadvantages of regenerating very slowly and giving excessive deposits of coke during the hydrocarbon conversion cycle. Low density catalysts are very fragile and are sometimes relatively inactive. Taking these factors into consideration, generally a gel having particle density of between about 1 and 1.4 gram per cc. will be employed. The apparent density of the gel will generally be between 0.65 and 0.9 gram per cc. Particle density, as used herein, is the density of the gel particles including the pores and is measured on the dried and calcined particles. Apparent density, on the other hand, includes also the free space between the gel particles and is therefore affected by the size, shape and packing of the particles.

Thus, hydrogels which normally lead to gels of high density when dried at atmospheric pressure and low temperature may, in accordance with the instant process, be dried in super-heated steam at elevated pressure and temperature. The higher the drying temperature and pressure, the lower is the density of the finished gel. Since the drying rate of the gel is dependent upon the amount of superheat in the steam and the steam rate through the bed of gel, the drying rate at a given temperature can be controlled by adjusting the steam pressure and steam rate. The minimum drying time is that sufficient to attain substantially complete shrinkage of the hydrogel. For a gel processed under given conditions, the greater the percentage of metal oxide in the gel, the higher is the density of the finished catalyst. Usually, a drying time consistent with the pressure and temperature conditions of the superheated steam drying medium employed will be in the range of ¼ to 8 hours. Drying times up to 24 hours may in some instances be used particularly where a deep bed depth of hydrogel particles are being dried.

Studies of the various gels of differing composition have established that within the foregoing ranges of pressure and temperature of the superheated steam drying medium, different gels respond differently to the specified drying conditions. Thus, chromia-alumina gels of approximately 10–40 percent by weight $Cr_2O_3$ and 60–90 percent by weight $Al_2O_3$ normally contain pores of very small diameter, thereby limiting the transfer of hydrocarbon vapors and regeneration gases through the gel pores to the diffusion rates of the gases. Upon drying chromia-alumina hydrogels having the above-indicated composition range on a dry basis with superheated steam at pressures in excess of about 100 pounds per square inch, the resultant gels exhibit improved regeneration characteristics. One of the principal shortcomings of silica-magnesia gel catalyst containing 20 to 40 percent by weight MgO and 60 to 80 percent by weight $SiO_2$ is due to the small porous structure of the gel. Because of such small porous structure, excessive amounts of coke are produced during cracking of petroleum hydrocarbons employing this catalyst and also extremely long times are required for regeneration. In accordance with the method of the invention, silica-magnesia gels containing 20 to 40 percent MgO and silica-alumina-magnesia gels containing 10 to 30 percent metal oxides, said gels having large porous structure and reduced apparent density can be prepared by drying the corresponding hydrogels in superheated steam under controlled conditions of high pressure and temperature. In the case of silica-alumina and silica gels, the hot water treatment which is frequently employed to lower the density of the gel may be eliminated with the drying pressure and temperature of superheated steam adjusted to give a finished gel of the desired density.

Having described in a general way the nature of this invention, it may be more readily understood by reference to the following illustrative non-limiting examples:

*Example 1*

A silica-magnesia hydrosol was prepared by mixing three separate reagent streams comprising magnesia, sodium silicate, and sulfuric acid in a mixing nozzle. The magnesia stream was composed of 13 pounds of light magnesia slurred in 181 pounds of water. The sodium silicate stream was composed of 105 pounds of sodium silicate solution, having an $Na_2O/SiO_2$ ratio of 1:3.22 and a gravity of 41° Bé., and 105 pounds of water. The sulfuric acid stream was composed of 17.4 pounds of 96.3% sulfuric acid and 127 pounds of water. The three streams were mixed under the following conditions:

|  | cc./min. |
|---|---|
| Acid solution rate | 265 |
| Silicate solution rate | 400 |
| Magnesia suspension rate | 335 |

The resulting hydrosol was allowed to flow over a dividing cone into an oil medium wherein the hydrosol in the form of globules set to spheroidal particles of hydrogel. The time of gelation of the above-prepared hydrosol was 4.9 seconds at 80° F. The resulting hydrogel had a pH of 9.3. The hydrogel particles, so formed, were treated for 6 hours at 160° F. while covered with water, after which the hydrogel particles were base-exchanged with a magnesium sulfate solution, washed free of soluble salts and dried under the conditions described below.

Portions of the above silica-magnesia hydrogel were dried in superheated steam under varying conditions of pressure and temperature. The resulting gel composites in each instance were calcined for 3 hours at 1300° F. in air and tested as hydrocarbon conversion catalysts in accordance with the Cat-A method described in National Petroleum News, volume 36, page R-537, August 2, 1944. The gel contained about 25% by weight MgO and about 75% by weight $SiO_2$. The drying conditions, physical properties of the resultant gel, and Cat-A activity results together with regeneration characteristics in each instance are set forth below:

| Drying Conditions | | Physical Properties | | | | | Cat-A Activity | | | | | | Regeneration Index |
|---|---|---|---|---|---|---|---|---|---|---|---|---|---|
| Press., p.s.i.g. | Steam Temp., °F. | Apparent Density, g./cc. | Particle Density, g./cc. | Surface Area, M.²/g. | Pore Volume, cc./g. | Avg. Pore Diameter, A. | Gasoline, Percent Volume | Coke, Percent Weight | Gas, Percent Weight | Gas Gravity | Gasoline/Coke | Gasoline/Gas | |
| 0 | 280 | 0.89 | 1.52 | 474 | 0.261 | 22 | 42.7 | 6.2 | 5.9 | 1.36 | 6.9 | 7.2 | 51 |
| 100 | 438 | 0.68 | 1.10 | 588 | 0.521 | 35 | 40.8 | 4.1 | 4.1 | 1.31 | 10 | 10 | 78 |
| 200 | 484 | 0.58 | 0.94 | 534 | 0.682 | 51 | 34.2 | 2.7 | 2.7 | 1.31 | 13 | 13 | 86 |

Example 2

A silica-magnesia hydrosol was prepared by mixing three separate reagent streams having the compositions described in Example 1. The three streams were mixed in this instance under the following conditions:

|  | Cc./min. |
|---|---|
| Acid solution rate | 265 |
| Silicate solution rate | 400 |
| Magnesia suspension rate | 500 |

The resulting hydrosol was allowed to flow over a dividing cone into an oil medium wherein the hydrosol in the form of globules set to spheroidal particles of hydrogel. The time of gelation of the above-prepared hydrosol was 3.6 seconds at 91° F. The resulting hydrogel particles having a pH of 10.2 were processed as in Example 1 and dried under conditions described below.

Portions of the above silica-magnesia hydrogel were dried in superheated steam under varying conditions of pressure and temperature. The resulting gel composites in each instance were calcined for 3 hours at 1300° F. in air and tested as hydrocarbon conversion catalysts in accordance with the Cat-A method. The gel contained about 37.1% by weight MgO and about 62.9% by weight $SiO_2$. The drying conditions, physical properties of the resultant gel, and Cat-A activity results together with regeneration characteristics in each instance are set forth below:

to remove this amount of catalyst deposit was a direct measure of the rate of carbon burn-off. The rate of carbon burn-off was compared with the rates from two standard catalysts, one of which (a silica-alumina bead catalyst having a bulk density of 1.0) was assigned an arbitrary regeneration index of zero and the other (an activated clay), a regeneration index of 100. The regeneration index is then defined as follows:

$$R.I. = \frac{\text{Time for zero standard} - \text{time for unknown}}{\text{Time for zero standard} - \text{time for 100 standard}} \times 100$$

Example 3

A silica-alumina-magnesia hydrosol was prepared by mixing three separate reagent streams comprising magnesia, sodium silicate, and a sulfuric acid solution containing aluminum sulfate in a mixing nozzle. The magnesia stream was composed of 13 pounds of light magnesia slurred in 181 pounds of water. The sodium silicate stream was composed of 105 pounds of sodium silicate solution, having an $Na_2O/SiO_2$ ratio of 1:3.22 and a gravity of 41° Bé., and 105 pounds of water. The third stream was composed of 10.1 pounds of 96.3% sulfuric acid, 104.5 pounds of water and 9.63 pounds of aluminum sulfate containing 45 percent by weight of water. The three streams were mixed under the following conditions:

|  | Cc./min. |
|---|---|
| Acid-aluminum sulfate solution rate | 265 |
| Silicate solution rate | 400 |
| Magnesia suspension rate | 310 |

| Drying Conditions | | Physical Properties | | | | | Cat-A Activity | | | | | | Regeneration Index |
|---|---|---|---|---|---|---|---|---|---|---|---|---|---|
| Press., p.s.i.g. | Steam Temp., °F. | Apparent Density, g./cc. | Particle Density, g./cc. | Surface Area, M.²/g. | Pore Volume, cc./g. | Avg. Pore Diameter, A. | Gasoline, Percent Volume | Coke, Percent Weight | Gas, Percent Weight | Gas Gravity | Gasoline/Coke | Gasoline/Gas | |
| 0 | 280 | 1.08 | 1.74 | 356 | 0.181 | 20 | 52.1 | 8.3 | 9.0 | 1.56 | 6.3 | 5.8 | 37 |
| 200 | 484 | 0.84 | 1.38 | 490 | 0.358 | 29 | 46.7 | 6.6 | 7.4 | 1.51 | 7.1 | 6.3 | 51 |
| 410 | 547 | 0.72 | 1.21 | 467 | 0.464 | 40 | 45.2 | 4.7 | 6.1 | 1.48 | 9.6 | 7.4 | 69 |

From the results of Examples 1 and 2, it will be seen that a distinct improvement in gasoline-to-coke and gasoline-to-gas ratios are achieved with silica-magnesia gel catalysts which have been dried in superheated steam at pressures of about 100 to 500 pounds per square inch as compared to atmospheric pressure drying and, further, that an improvement in the regeneration characteristics of silica-magnesia gel catalysts is obtained as indicated by the increase in regeneration index of the catalyst resulting from high pressure drying in superheated steam.

The operation of the regenerability test employed was as follows:

Fifty cc. (packed volume) of the catalyst were placed in an electrically heated glass tube. The standard cracking stock (pressed distillate from a paraffinic-mixed base crude; A.P.I. gravity of 30.5; boiling range of 600–700° F.) was vaporized and passed through the catalyst bed at 900° F. and at a liquid hourly space rate of 0.6 until a carbonaceous deposit of 22±2 grams per liter of catalyst was laid down. After purging the vapors from the system, the temperature of the catalyst was raised to 1000±5° F. and air was passed through the bed at a rate of 600 cc. (measured at room conditions) per minute. The regeneration was carried out at this rate until 85 percent of the deposit was burned off. The time required The resulting hydrosol was allowed to flow over a dividing cone into an oil medium wherein the hydrosol in the form of globules set to spheroidal particles of hydrogel. The time of gelation of the above-prepared hydrosol was 4.7 seconds at 86° F. The resulting hydrogel particles had a pH of 9.8. The hydrogel particles, so formed, were treated for 6 hours at 160° F. while covered with water, after which the hydrogel particles were base-exchanged with an aluminum sulfate solution, washed free of soluble salts and dried under the conditions shown below.

Portions of the above silica-alumina-magnesia hydrogel were dried in superheated steam under varying conditions of pressure and temperature. The resulting gel composites in each instance were calcined for 3 hours at 1300° F. in air and tested as hydrocarbon conversion catalysts in accordance with the Cat–A method. The gel contained 14.4% by weight $Al_2O_3$, 4.7% by weight MgO, and remainder $SiO_2$. The drying conditions, apparent density of the resultant gel, and Cat–A activity results together with regeneration characteristics in each instance are set forth below:

| Drying Conditions | | Physical Property, Apparent Density, g./cc. | Cat-A Activity | | | | | | Regeneration Index |
|---|---|---|---|---|---|---|---|---|---|
| Press., p.s.i.g. | Steam Temp., °F. | | Gasoline, Percent Vol. | Coke, Percent Wt. | Gas, Percent Wt. | Gas Gravity | Gasoline/Coke | Gasoline/Gas | |
| 0 | 280 | 1.05 | 44.0 | 5.1 | 10.4 | 1.49 | 8.6 | 4.2 | 71 |
| 100 | 440 | 0.55 | 33.3 | 2.3 | 6.0 | 1.42 | 14 | 5.6 | 104 |
| 405 | 541 | 0.38 | 29.7 | 1.9 | 3.2 | 1.39 | 16 | 9.3 | 105 |

Example 4

A silica-alumina-chromia hydrosol was prepared by mixing a sodium silicate solution containing by weight 14.0% $SiO_2$, 4.4% $Na_2O$, 81.6% $H_2O$ and an acidic solution containing by weight 3.83% $Al_2(SO_4)_3$, 0.13% $Cr_2(SO_4)_3 \cdot K_2SO_4$, 2.68% $H_2SO_4$ and 93.36% $H_2O$. Equal volumes of the above solutions were mixed at about 50° F. and the resulting hydrosol was introduced into an oil medium in which it set to a hydrogel in the form of spheroidal particles. The time of gelation was 5 seconds for the above hydrosol and the pH was 8.4. The hydrogel particles, so formed, were treated for 8 hours at 124° F. while covered with water, after which the hydrogel particles were base-exchanged with aluminum sulfate solution, washed free of soluble salts and dried under the conditions shown below.

Portions of the above silica-alumina-chromia hydrogel were dried in superheated steam under varying conditions of pressure and temperature. The resulting gel composites in each instance were calcined for 5 hours at 1300° F. in air and tested as hydrocarbon conversion catalysts in accordance with the Cat-A method. The gel contained about 10% by weight $Al_2O_3$, 0.15% by weight $Cr_2O_3$, with the remainder being $SiO_2$. The drying conditions, apparent density of the resultant gel, and Cat-A activity results together with regeneration characteristics are set forth below:

| Drying Conditions | | Physical Property, Apparent Density, g./cc. | Cat-A Activity | | | | | | Regeneration Index |
| --- | --- | --- | --- | --- | --- | --- | --- | --- | --- |
| Press., p.s.i.g. | Steam Temp., °F. | | Gasoline, Percent Vol. | Coke, Percent Wt. | Gas, Percent Wt. | Gas Gravity | Gasoline/Coke | Gasoline/Gas | |
| 0 | 268 | 0.69 | 37.3 | 2.3 | 6.0 | 1.46 | 16 | 6.2 | 98 |
| 100 | 438 | 0.50 | 23.9 | 1.0 | 2.8 | 1.17 | 24 | 8.5 | 109 |
| 200 | 488 | 0.41 | 19.4 | 1.0 | 1.9 | 1.01 | 19 | 10 | |
| 400 | 549 | 0.35 | | | | | | | |

Example 5

A chromia-alumina hydrosol was prepared by mixing a chromic acetate solution containing 11.1 grams $Cr_2O_3$ per 100 cc. and having a chromic to acetate ion ratio of 1:3 with a sodium aluminate solution containing 26.6 grams $Al_2O_3$ per 100 cc. and having a sodium to aluminum ion ratio of 1.3. The above solutions were mixed in a maxing nozzle under the following conditions:

|  | Cc./min. |
| --- | --- |
| Chromic acetate rate | 720 |
| Sodium aluminate rate | 675 |

The resulting hydrosol was introduced into an oily medium in the form of globules which set in 7 seconds at 121° F. and a pH of 11.7 to spheroidal particles of chromia-alumina hydrogel. The particles were thereafter treated with a 20% by weight aqueous solution of $(NH_4)_2SO_4$ for 24 hours, washed free of soluble salts and dried under conditions described below.

Portions of the above chromia-alumina hydrogel were dried in superheated steam under varying conditions of pressure and temperature. The dried gel was calcined 3 hours at 1025° F. in a steam atmosphere. The gel contained approximately 32% by weight $Cr_2O_3$ and 68% by weight $Al_2O_3$. The drying conditions and physical properties of the resultant gel in each instance are set forth below:

| Drying Conditions | | Physical Properties | | | | |
| --- | --- | --- | --- | --- | --- | --- |
| Press., p.s.i.g. | Steam Temp., °F. | Particle Density, g./cc. | Apparent Density, g./cc. | Surface Area, M.²/g. | Pore Volume, cc./g. | Avg. Pore Diameter, A. |
| 0 | 239 | 1.60 | 0.96 | 240 | 0.348 | 58 |
| 410 | 570 | 1.22 | 0.78 | 271 | 0.549 | 81 |

From the data embodied in the foregoing examples, it will be seen that a reduction in apparent density is obtained by drying hydrogels of varying composition in superheated steam at elevated pressures in excess of 100 pounds per square inch up to about 500 pounds per square inch. It will further be noted that the density decreases with increase in pressure and temperature of the superheated steam drying medium and that the density of the resultant gel may accordingly be adjusted to a predetermined value by control of the pressure and temperature conditions maintained during drying.

I claim:

1. A method for producing an inorganic oxide gel characterized by a particle density of between about 1 and 1.4 grams per cubic centimeter, which comprises forming an inorganic oxide hydrogel which, if dried and calcined at atmospheric pressure, would have a particle density in excess of 1.5, subjecting said hydrogel, without prior substantial dehydration thereof, to contact with superheated steam at a temperature between about 350° F. and about 800° F. and a pressure between 100 and 500 pounds per square inch until shrinkage of the hydrogel is substantially complete, and thereafter calcining the resultant dried, shrunken hydrogel at an elevated temperature of at least 1025° F.

2. A method for producing an inorganic oxide gel characterized by a particle density of between about 1 and about 1.4 grams per cubic centimeter, which comprises forming an inorganic oxide hydrogel which, if dried and calcined at atmospheric pressure, would have a particle density in excess of 1.5, subjecting said hydrogel, without prior substantial dehydration thereof, to contact with superheated steam at a pressure in the range of 100 to 500 pounds per square inch and a temperature above the saturation temperature for a period of between ¼ and 8 hours until shrinkage of the hydrogel is substantially complete, and thereafter calcining the resultant dried, shrunken hydrogel at substantially atmospheric pressure and an elevated temperature of at least 1025° F.

3. A method for producing a gel consisting essentially of a major proportion of silica and a minor proportion of alumina and characterized by a particle density of between about 1 and about 1.4 grams per cubic centimeter, which comprises forming a hydrogel having a solids content consisting essentially of a major proportion of silica and a minor proportion of alumina and which, if dried and calcined at atmospheric pressure, would have a particle density in excess of 1.5, subjecting said hydrogel, without prior substantial dehydration thereof, to contact with superheated steam at a temperature between about 350° F. and about 800° F. and a pressure between 100 and 500 pounds per square inch until shrinkage of the hydrogel is substantially complete, and thereafter calcining the resultant dried, shrunken hydrogel at an elevated temperature of at least 1025° F.

4. A method for producing a chromina-alumina gel having a content of 10 to 40 percent by weight of chromia and 60 to 90 percent by weight of alumina and characterized by a particle density of between about 1 and about 1.4 grams per cubic centimeter, which comprises forming a chromia-alumina hydrogel which, if dried and calcined at atmospheric pressure, would have a particle density in excess of 1.5, subjecting said hydrogel, without prior substantial dehydration thereof, to contact with superheated steam at a temperature between about 350° F. and about 800° F. and a pressure between 100 and 500 pounds per square inch until shrinkage of the hydrogel is substantially complete, and thereafter calcining the resultant dried, shrunken hydrogel at an elevated temperature of at least 1025° F.

5. A method for producing a silica-magnesia gel having a content of 20 to 40 percent by weight of magnesia and 60 to 80 percent by weight of silica and characterized by a particle density of between about 1 and about 1.4 grams per cubic centimeter, which comprises forming a silica-magnesia hydrogel which, if dried and calcined at atmospheric pressure, would have a particle density in excess of 1.5, subjecting said hydrogel, without prior substantial dehydration thereof, to contact with superheated steam at a temperature between about 350° F. and about 800° F. and a pressure between 100 and 500 pounds per square inch until shrinkage of the hydrogel is substantially complete, and thereafter calcining the resultant dried, shrunken hydrogel at an elevated temperature of at least 1025° F.

6. A method for producing a silica-alumina-magnesia gel having a content of 10 to 30 percent by weight metal oxides and remainder, silica, and characterized by a particle density of between about 1 and about 1.4 grams per cubic centimeter, which comprises forming a silica-alumina-magnesia hydrogel which, if dried and calcined at atmospheric pressure, would have a particle density in excess of 1.5, subjecting said hydrogel, without prior substantial dehydration thereof, to contact with superheated steam at a temperature between about 350° F. and about 800° F. and a pressure between 100 and 500 pounds per square inch until shrinkage of the hydrogel is substantially complete, and thereafter calcining the resultant dried, shrunken hydrogel at an elevated temperature of at least 1025° F.

References Cited in the file of this patent

UNITED STATES PATENTS

| | | |
|---|---|---|
| 1,762,228 | Holmes | June 10, 1930 |
| 1,772,055 | Miller et al. | Aug. 5, 1930 |
| 2,358,202 | Behrman | Sept. 12, 1944 |
| 2,377,547 | Fuchs | June 5, 1945 |
| 2,378,155 | Newsome et al | June 12, 1945 |
| 2,477,664 | Shabaker | July 29, 1947 |
| 2,694,673 | Kimberlin et al. | Nov. 16, 1954 |
| 2,698,305 | Plank et al. | Dec. 28, 1954 |